(12) United States Patent
Franz et al.

(10) Patent No.: US 6,401,906 B1
(45) Date of Patent: Jun. 11, 2002

(54) S-SHAPED BOARD UNSCRAMBLER

(76) Inventors: Timothy G. Franz; Robert M. Smelcer, both of 13710 E. Everett, Spokane, WA (US) 99216

( * ) Notice: Subject to any disclaimer, the term of this patent is extended or adjusted under 35 U.S.C. 154(b) by 0 days.

(21) Appl. No.: 09/765,710

(22) Filed: Jan. 22, 2001

(51) Int. Cl.[7] ............................................. B65G 47/24
(52) U.S. Cl. ................................................. 198/397.06
(58) Field of Search ........................ 198/397.01, 397.06

(56) References Cited

U.S. PATENT DOCUMENTS

| | | | |
|---|---|---|---|
| 2,644,569 A | 7/1953 | Fancisco | ...................... 198/33 |
| 3,162,292 A | * 12/1964 | Lawson | ................... 198/397.06 |
| 3,624,773 A | 11/1971 | Krooss | .......................... 198/33 |
| 3,835,985 A | 9/1974 | Johnson | ................... 198/33 AA |
| 3,924,732 A | 12/1975 | Leonard | ...................... 198/287 |
| 4,909,375 A | * 3/1990 | Cotic et al. | ............. 198/397.06 |
| 5,810,150 A | 9/1998 | Martin et al. | ................ 198/397 |

* cited by examiner

Primary Examiner—Joseph E. Valenza
(74) Attorney, Agent, or Firm—Keith S. Bergman

(57) ABSTRACT

A board unscrambler for lumber processing provides an upwardly and forwardly extending S-shaped curvilinear conveyor with a rearward horizontal portion to receive an agglomeration of scrambled boards, a medial uprising portion to unscramble and align the boards and a forward portion to deliver the boards at an elevated position. The conveyor provides at least two spaced link chains and interconnecting bars that are carried on an S-shaped conveyor support surface defining spaced parallel open top channels where each link chain is supported and maintained by synchronously driving both the lower rearward input portions of the chains to push the lower chain portions and the upper output portions to pull the upper chain portions to maintain the chains in the channels without vertical restraints. The unscrambled boards are delivered in an aligned single layer from the forward elevated portion of the conveyor.

4 Claims, 3 Drawing Sheets

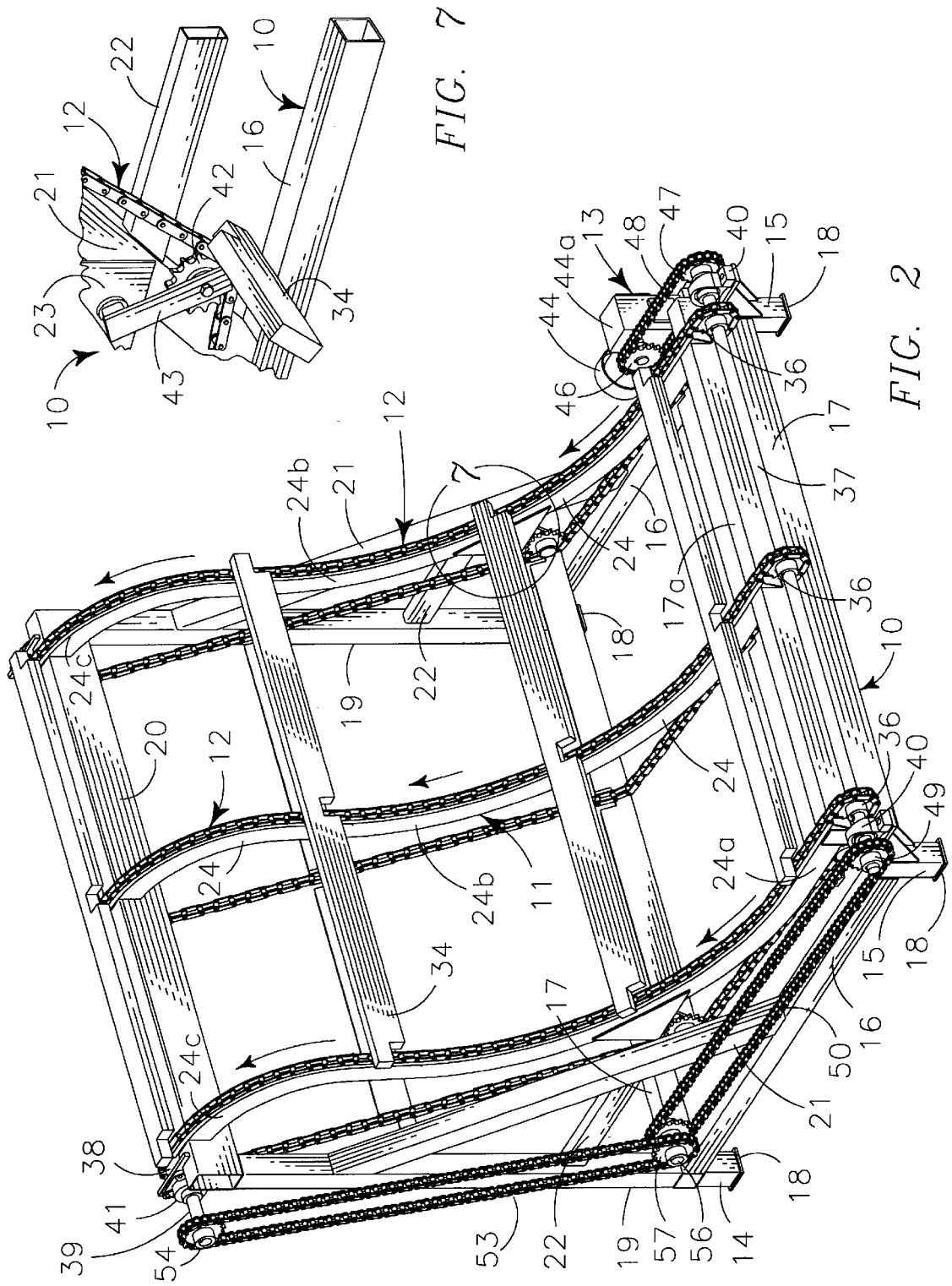

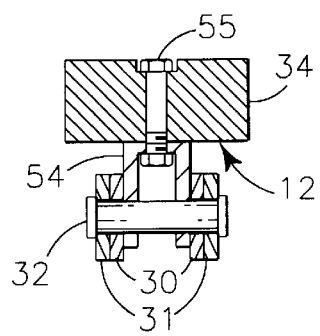
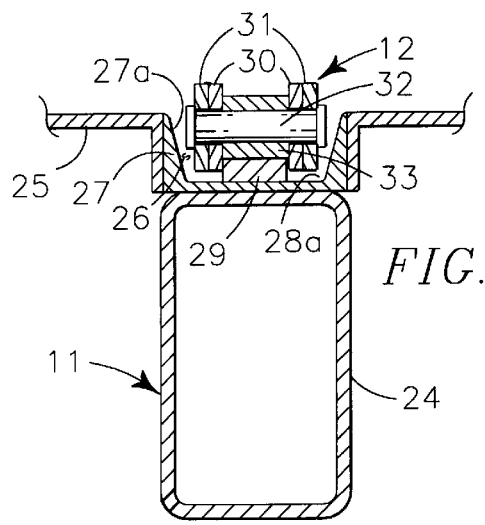
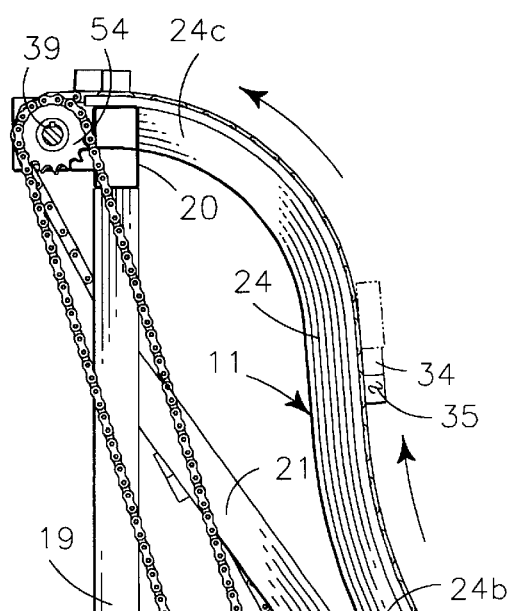
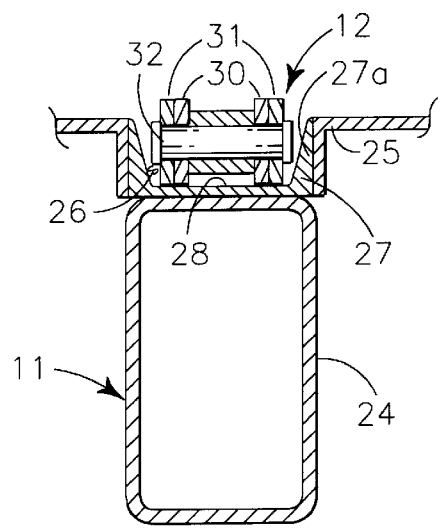
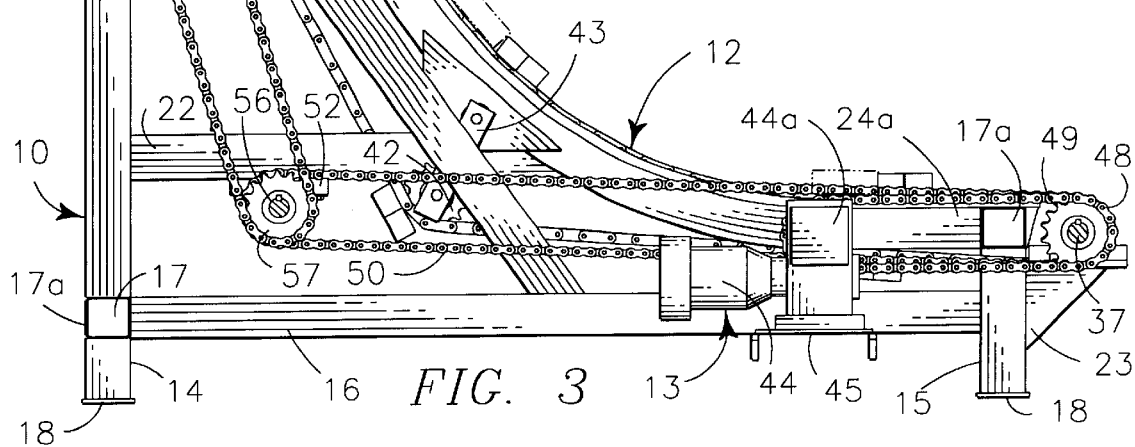

S-SHAPED BOARD UNSCRAMBLER

RELATED APPLICATIONS

There are no applications for patent related hereto heretofore filed in this or any foreign country.

1. Field of Invention

This invention relates generally to power driven conveyors and more particularly to a board conveyor that receives an agglomeration of scrambled boards and unscrambles and aligns the boards perpendicularly to the conveyor course during conveyance.

2. Background and Description of Prior Art

Lumber manufacture in the modern time has become increasingly competitive to a point where its operations must be automated as much as possible for economic viability of the manufacturing process. In automating various lumber processing machinery it often is necessary to receive an agglomerated supply of scrambled boards, having longer dimensions extending somewhat in the same general direction, and turn the boards to a uniform parallel attitude while singulating them, individually or in small groups, in adjacency or at discrete intervals for delivery to other mechanisms for further processing. Machines accomplishing this function are commonly known in the lumber industry as "unscramblers" and the instant invention seeks to provide a new and improved form of such machine that resolves problems that have existed in previous unscrambling mechanisms.

Traditional lumber unscramblers, and those in common use in the present day, have provided an upwardly and forwardly extending conveyor generally having a linearly angulated course with sufficient slope that disorientated boards moving forwardly by reason of support on some type of cog or bar structure of the conveyor or on the conveyor support surface tumble rearwardly on the conveyor before the boards reach a forward position at the upper forward portion of the conveyor. Commonly, such linear unscramblers have had some type of a hopper, with or without a separate feeding mechanism, associated with their lower rearward course to receive a supply of scrambled boards, since no flat portion could be provided in the lower rearward course of such conveyors where boards could be dumped, accumulated or stored until they were moved, because of the lineal nature of the conveyor with a uniform slope throughout its course.

Unscrambling linear conveyors also have not been completely successful in unscrambling boards. They often allow one or more disoriented boards to be supported by the conveyor structure or other boards in a fashion to maintain their disorientated array, rather than being completely and directly supported on the conveyor or its support surface, without tumbling rearwardly for reorientation. This usually requires manual intervention of a workman to maintain proper functioning and tends to lessen efficiency and economic viability of the unscrambling process. Hopper structures have presented additional problems as generally scrambled boards must be reasonably well aligned, both lengthwise and in approximately parallel relationship, to be fed from a hopper orifice. When boards are not so aligned the feeding operation may and often does break boards as they leave the hopper and enter the conveyor through the hopper orifice or feeding mechanism between the hopper and conveyor to cause either the hopper orifice or feeding mechanism to become plugged and require manual intervention to maintain conveyor operation. Linear unscramblers, because of these problems and the essential nature of the conveyors, have relatively low production speed limitations and reliability.

The instant unscrambler seeks to eliminate or substantially lessen these problems by providing a conveyor having a vertically curvilinear course in the general configuration of an angulated upwardly and forwardly extending S-shaped curve. Such a curve allows definition of a relatively flat horizontal area in its lower rearward portion, where an agglomeration of scrambled boards may be dumped directly unto the conveyor without use of any type of intervening hopper structure, orifice or singulator to avoid the problems associated with these later structures. The curvilinear configuration of the conveyor also allows a more steeply rising medial portion that may approach a tangential angle of 75 degrees or more from the horizontal to make more certain the unscrambling of disorientated boards carried by a single cog or bar structure by uniformly causing excess boards to tumble rearwardly on the steeply curved portion of the conveyor. The S-type curvilinear configuration, however, still allows the unscrambled and aligned boards to be delivered at a spacedly forward, vertically distant point in aligned orientation for receipt by other processing equipment.

The use of such a curvilinear type conveyor course is allowed primarily by reason of the method of driving the link chain conveyor. Link chain conveyors with cogs, or more commonly with elongate bars carried between at least two laterally spaced chain courses, have heretofore been used in unscramblers having a linear course of travel, but such linear conveyors have been powered by driving mechanism in the forward or at least medial portion of the conveyor course that has provided only a pulling force on the link chains upwardly thereof to cause forward motion of the link chains with or without an underlying support.

Such linear link chain conveyors require relatively tightly supported chains to create a substantially linear chain course between the driving linkage and the rearwardly adjacent chain support structure because of the required tension in the chain to move boards at a practical speed for lumber processing. Because of the pulling action on the chain, if the chain were sufficiently slack to follow a curvilinear course it would not effectively or efficiently perform its conveying operation, if it would do so at all. The instant curvilinear conveyor in contradistinction drives the chains of the conveying flight of a conveyor at both the lower rearward end and the upper forward end. This method of powering the conveyor chains causes a pushing force on the rearward active portion of the chain and a pulling force on the forward active portion to allow the chains to be loosely maintained in open channels defined in the conveyor support surface between the spaced driving linkages. This maintains curvilinear configuration of the chains on the conveyor support surface channels to provide substantially more efficient unscrambling with greater speed than prior unscrambler chains and without mechanical structures limiting upward chain motion which may interfere with either board conveyage or unscrambling.

The use of conveying devices having a vertically curvilinear conveyor course to singulate and orientate various industrial and food products has heretofore become known in general, but it is not known that such conveyors have been used for elongate materials of substantial length such as lumber or have positionally maintained their chains in open guiding channels or without mechanical confinement or constraint of some chain portion. Such known curvilinear conveyors generally have had particular structures which would prevent or substantially limit their use with elongate boards. All such known conveyors have had upstanding sides at one or both lateral edges of the conveyor to define horizontally extending channels carrying an adjacent conveyor chain, or some support element associated with the conveyor or claim, to direct the curvilinear course of the chain. The instant unscrambling singulator has no such side structures either projecting above the curvilinear conveyor surface that supports and directs motion of the conveying chains or elsewhere. This construction allows scrambled boards to be placed on the instant conveyor without regard to the position of their ends in relation to the lateral edges to the conveyor and is allowed by reason of the particular drive mechanism for the conveying portions of the chains that pushes their lower rearward input ends and pulls their upper forward output ends.

If a board singulator and unscrambler has upstanding side edges, those edges may interfere with boards carried by the conveyor, especially in an area where delivered from a hopper, and such conveyors commonly require substantial human attention to properly position boards on the conveyor chains and assure proper board feed from a hopper or an associated feeding structure. Such unscramblers generally will not allow feeding by dumping an assemblage of scrambled boards on the chain to slow their speed of operation and have a higher probability of breaking boards or associated singulator or feeding mechanism by reason of disoriented boards, especially when used for boards of smaller cross sectional dimensions and irregular shape, such as stickerers reused to separate piled green lumber for kiln drying.

The instant unscrambler may be variously sized and configured for all of the types of boards dealt with in lumber processing, from short dimension blocks for finger gluing assemblage through slender stickerers of medial length to the longest and heaviest timbers having a length of twenty feet or more. The unscrambler also may be configured as a module for use in any lumber processing line with variable dimensioning of length, of height, of input and output zones and of width between the lateralmost conveyor chains.

Our invention resides not in any one of these features individually, but rather in the synergistic combination of all of the structures of our unscrambler that necessarily give rise to the functions flowing therefrom.

SUMMARY OF INVENTION

Our unscrambler generally provides a frame carrying drive mechanism and supporting conveying mechanism having an uppermost support surface carrying a link chain conveyor. The support surface comprises a horizontal ruled surface with an angulated S-shaped configuration in a vertical plane and defines at least two parallel upwardly opening spaced channels to carry conveyor chains on the support surface with bars extending over the support surface and between the chains to move boards on the conveyor. The vertically curvilinear shape of the support surface provides a substantially horizontal rearward portion to receive an assemblage of scrambled boards, a medial steeper portion where boards not properly unscrambled and arrayed on the conveyor automatically tumble rearwardly for further processing and a forward substantial horizontal portion to deliver unscrambled and aligned boards individually or in small groups for further processing. Drive mechanism carried by the frame provides an electric motor synchronously driving the conveyor chains both in their lower rearward and upper forward portions to push the rearward chain portions and pull the forward chain portion to move the chains while maintaining them in the channels to direct their course of motion.

In providing such a mechanism it is:

A principal object to provide an unscrambler that has a singulating and unscrambling conveyor for boards that is supported on a support surface configured as a horizontal ruled surface with an angulated S-shaped curvilinear configuration in a vertical plane.

A further object is to provide such an unscrambler support surface that has a lower rearward generally horizontal portion to receive an agglomeration of scrambled boards, a steeply angulated medial portion to cause improperly orientated boards to tumble rearwardly for further processing and an upper forward upper portion to deliver single or small groups of unscrambled and properly arrayed boards for further processing.

A still further object is to provide such an unscrambler that has an uppermost support surface defining at least two laterally spaced parallel open top channels to receive link chains of a conveyor and direct chain motion along the support surface to move boards thereover.

A still further object is to provide such a conveyor that has powered driving mechanism in the lower rearward portion of the active conveyor flight to push the lower portion of the conveyor chains forwardly and upwardly and in the upper forward portion of the conveyor flight to pull the forward portions of the conveyor chains forwardly to allow the chains to be movably carried between the driving mechanisms and yet maintain their course of travel in the open top channels defined in the support surface.

A still further object is to provide such an unscrambler that moves boards over the support surface so that the boards are supported by spaced bars extending between at least two spaced parallel conveyor chains.

A still further object to provide such mechanism that is of new and novel design, of rugged and durable nature, of simple and economic manufacture and one that is otherwise well suited to the uses and purposes for which it is intended.

Other and further objects of our invention will appear from the following specification and accompanying drawings which form a part hereof, but in carrying out the objects of our invention it is to be understood that its features are susceptible to change in design and structural arrangement with only a preferred and practical embodiment of the best known mode being specified and illustrated in the accompanying drawings as is required.

BRIEF DESCRIPTION OF DRAWINGS

In the accompanying drawings which form a part hereof and wherein like numbers of reference refer to similar parts throughout:

FIG. 2 is an isometric view of the singulator of FIG. 1 looking rearwardly from a left forward aspect with the upper support and guard structures removed to show internal structure of the mechanism.

FIG. 3 is an orthographic left side view of the mechanism of FIG. 2.

FIG. 4 is an enlarged partial vertical cross-sectional view through a portion of the upper conveyor support showing a first species of chain support channel, taken on the line 4—4 of FIG. 1 in the direction indicated by the arrows thereon.

FIG. 5 is an enlarged partial vertical cross-sectional view through the upper conveyor support taken on a line such as FIG. 4, but showing a second species of chain support channel having a medial ridge supporting the roller chain pins.

FIG. 6 is an enlarged vertical cross-sectional view through the structure connecting a conveyor roller chain with a bar carried thereby, taken on the line 6—6 of FIG. 1 in the direction indicated by the arrows thereon.

FIG. 7 is an enlarged partial isometric view of the roller chain tightening structure, taken in a portion of the area in the circle 7 on FIG. 2.

DESCRIPTION OF THE PREFERRED EMBODIMENT

Figure 1:
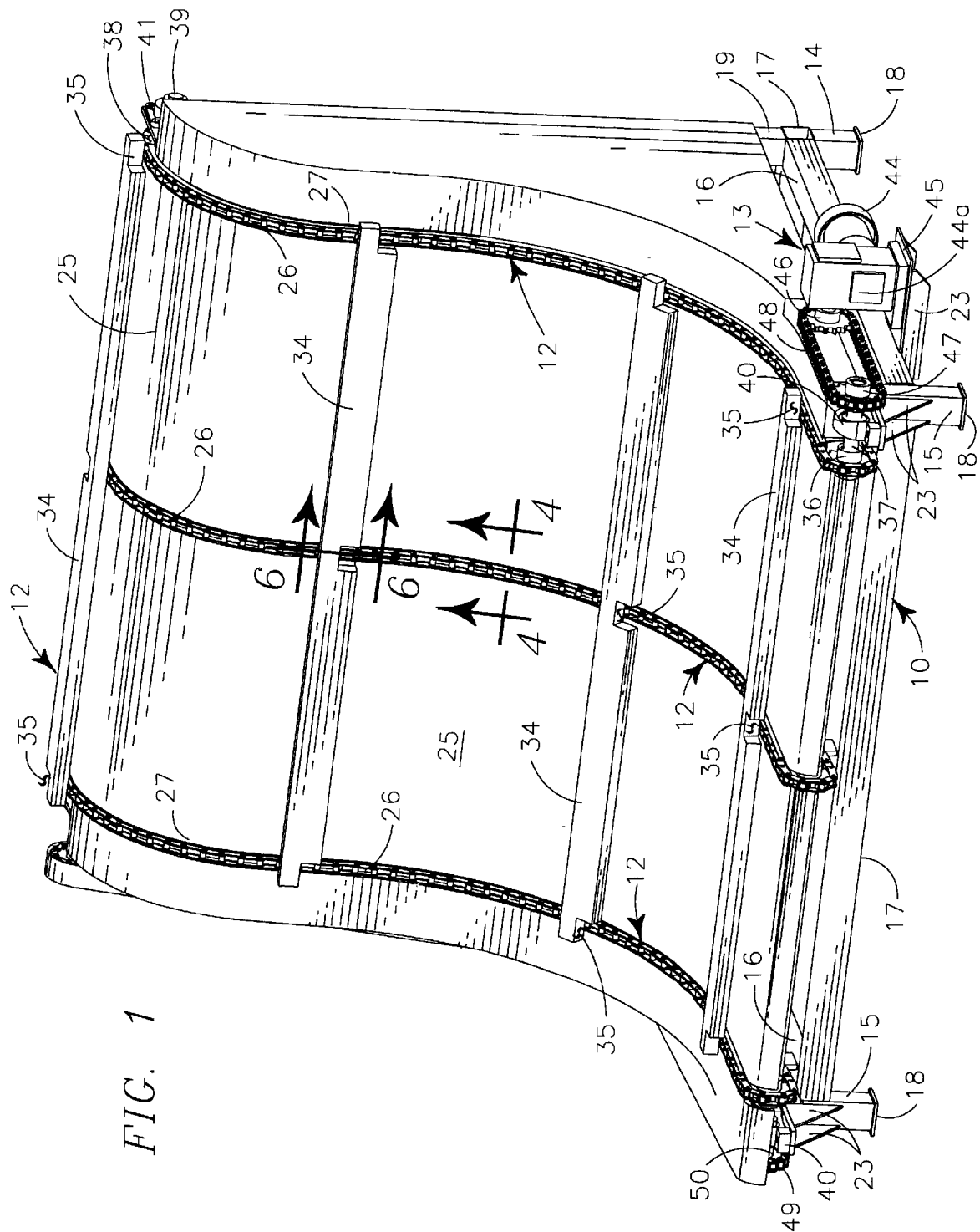
FIG. 1 is a rearwardly looking isometric surface view of our unscrambler from a right foreward aspect to show various of its parts, their nature and relationship.

Our invention generally provides frame 10 supporting upper conveyor support 11 carrying conveyor 12 which is powered by driving mechanism 13.

Frame 10 in the instance illustrated comprises similar laterally spaced forward legs 14 and somewhat longer rearward legs 15 interconnected by coplanar lower lateral beams 16 extending in an elongate direction between each lateral pair of legs 14, 16. Lower coplanar elongate beams 17, coplanar with beams 16 extend laterally between each elongate pair of forward and rearward legs. Upper rearward elongate beam 17a extends between the upper portions of the rearward legs 15. The base of each leg 14, 15 carries foot plate 18 to aid support on a an underlying supportive surface. The lateral end portions of the forward elongate beam 17 support similar spacedly opposed forward upstanding beams 19 interconnected in their uppermost portions by forward upper lateral beam 20 extending therebetween. Similar angulated support beams 21 extend between the medial portions of each adjacent lower lateral beam 16 and forward upstanding beam 19 with lateral horizontal support beam 22 extending between the medial portions of each angulated support beam 21 and the adjacent forward upstanding beam 19 to provide additional strength and rigidity for the frame. These frame elements are formed by box beams with adjacent surfaces of the various frame elements structurally interconnected by known metal joining methods, in the instance illustrated by welding.

The principal frame carries various sub-frame elements 23 as necessary to support mechanism of the various elements of the unscrambler. Some of these sub-frame members are hereinafter specified in detail and identified by separate individual numbers. The various sub-frame elements are formed of metallic stock and joined to the supporting principal frame elements by normal metal joining methods, in the instance illustrated by welding.

At least two, and in the instance illustrated three, laterally spaced conveyor support beams 24 extend in structural interconnection from rearward elongate beam 17a to forward upper elongate beam 20. The conveyor support beams 24 define a forwardly and upwardly extending compound curvilinear surface in a vertical plane as illustrated in FIGS. 2–3. The detailed vertical configuration of the conveyor support beams 24 is not critical and can remain within the scope of our invention so long as the essence of that configuration is maintained with three distinguishable portions that are smoothly interconnected by tangential curves.

The rearward portion 24a of the support beams provides a relatively flat, generally horizontally orientated portion defining an area to receive a scrambled agglomeration of boards and maintain that agglomeration on the rearward conveyor portion until the boards move forwardly and align individually or in small groups forwardly of conveyor bars. Steeper medial curvilinear portion 24b continues in continuous relationship to comprise approximately a medial third of the active conveyor surface which rises quit steeply, more in its forward then rearward part, to a tangential angle that can approach 90 degrees. This conveyor curvature causes boards not supported directly on the conveyor to tumble rearwardly to the rearward part of the medial portion 24b or to the rearward horizontal portion 24a for further unscrambling and alignment. Forward horizontal portion 24c communicates in a downwardly curving configuration from tangential interconnection with the steeper medial portion 24b to a forwardmost substantially horizontal portion to deliver unscrambled parallel orientated boards that are arrayed perpendicularly to the conveyor for further processing.

The overall horizontal length and vertical height of the conveyor support beams 24 may vary from the preferred length of approximately 12 feet and height of 9 feet to meet particular needs. Variation from these dimensions must be determined not only by the proper functioning of the unscrambler and the positions at which it receives and delivers boards, but also by operational parameters, especially such as the dimensions of boards to be unscrambled and the speed of conveyor travel. Conveyor support beams 24 are preferably, but not necessarily, of a box beam type structurally joined to the frame, as by welding in the instance illustrated. There must be at least two such support beams 24 arrayed in spaced, generally parallel relationship to properly support and service the conveyor structure.

Conveyor support surface 25 geometrically is a ruled surface formed by horizontally extending ruling lines with a configuration in a vertical plane similar to that of the conveyor support beams to fit therebetween or thereover for support and to present a surface over and along which boards may move in a forward direction. The conveyor support surface 25 is formed of sheet metal and extends between the support beams 24 in a coplanar relationship therewith or immediately upwardly adjacent to the upper surface of the support beams with an overall width or horizontal dimension at least as great as the distance between the laterally outer surfaces of the two laterally most distal support beams. The conveyor support surface 25 is structurally joined to the support beams 24 by known metal joining methods, in the instance illustrated by welding.

Conveyor support surface 25 defines at least two parallel spaced conveyor chain channels 26, in the instance illustrated three such channels, to accommodate each elongate roller chain of conveyor 12. The conveyor chain channels 26 have a cross sectional configuration with a width or horizontal dimension incrementally greater than the width of a conveyor chain to be carried therein and a depth or vertical dimension normal to the support surface 25 of somewhat less than the vertical height of the conveyor chain to be supported therein. Such channels 26 provide directional control for the associated conveyor chain while yet maintaining the outer surface of the conveyor chain spacedly outwardly from the surface of the conveyor support to support boards carried on the conveyor spacedly above the conveyor support surface 25 to prevent friction between that surface and the boards moved thereover. The conveyor chain channels 26 may be formed directly in the conveyor support surface 25 or by separate channel elements 27, as in the instance illustrated. Such channel elements 27 may be supported on the upper surface of the conveyor support beams 24 if in a position thereover and, if otherwise positioned, by the conveyor support surface itself. The specific structure of these channels is not essential to our invention and various constructional forms are within its scope, so long as the channels fulfill the specified requirements.

The first species of conveyor chain channel 26 illustrated in FIG. 4 provides a channel having a horizontal width incrementally greater than that of a conveyor link chain to be carried therein and sides 27a sloping somewhat inwardly toward each other to the channel bottom 28 to provide lateral surfaces that tend to maintain a conveyor chain carried therein in a medial position. The channel configuration is determined so that a chain carried in the channel rests on channel bottom 28 with lowermost portions of its side links supported directly on the channel bottom. Such a construction provides a frictional contact between the channel bottom and a chain moving in the channel that may cause wear on the adjacent moving surfaces, which must be considered in designing both the conveyor chain and the channel.

The second species of channel illustrated in FIG. 5 provides the same configuration of channel sides 27 as the first species, but channel bottom 28a provides medial upstanding ridge 29 to support a link chain in the channel on its connector pins or spacers thereabout if present. To accomplish this result the upstanding ridge 29 must have a height incrementally greater than the radial distance between the outermost surface of the link chain connector pin structure and the outer surface of the associated link and a width incrementally less than the distance between the adjacent surfaces of the two innermost links of the chain as seen in FIG. 5. This channel structure provides a potential rolling contact of the chain with the medial upstanding ridge, especially when the link chain pins are covered by spacing sleeves that may rotate relatively to the pins interconnecting laterally opposed links.

Conveyor 12 provides at least two parallel laterally spaced link chains formed by spaced pairs of inner links 30 interconnected to spaced pairs of outerlinks 31 for relative pivotal motion by pins 32 extending therebetween. Link chains commonly provide tubular rotatable spacers 33 about connector pins 32 with an axial length incrementally less than the distance between the adjacent surfaces of the two laterally opposed inner links 30 to allow rolling motion of the spacer 33 on the pin 32 carrying it. This type of rolling spacer 33 is particularly adaptable for use with the second species of conveyor chain channel having ridge 29. This structure is common in most present day roller type link chains and generally such chains are adaptable for use in our conveyor. At least two such link chains are provided in the lateral portions of the conveyor and one or more medial link chains may be provided therebetween as illustrated in FIG. 2. One such chain normally, but not necessarily, is provided for each conveyor chain channel 26 defined in the upper conveyor support surface 25.

Each conveyor chain is interconnected to the other chains of a conveyor flight by elongate conveyor bars 34 extending perpendicularly therebetween. As seen in FIG. 6 conveyor bars 34 are pivotally mounted on the outer surfaces of the conveyor chains by brackets 54 pivotally carried by connector pins 32 of the link chains with nut-bolt combinations 55 interconnecting the bars 34 and associated brackets 54, as heretofore known in the lumber conveying arts. The conveyor bars 34 are of general rectilinear configuration to define a planar forward edge to support and align unscrambled boards forwardly thereof. The rearwardly facing edges of the conveyor bars 34 define chain notches 35 above each conveyor chain to allow pivoting motion of the conveyor bars 34 relative to the chains carrying them so that the bars will not interfere with chain motion along its curvilinear course, and especially at the more sharply curved transition portions of the conveyor course. The conveyor bars preferably have a lateral length not substantially greater than the distance between the two lateralmost link chains of a conveyor carrying them and at least less than the lateral distance between the adjacent inner surfaces of laterally opposed frame side elements so that conveyor may freely move about the conveyor supports without interference from the frame.

The conveyor link chains are of an endless type supported in their lower rear portions by cogs 36 irrotatably carried by rearward drive shaft 37 and in their forward portion by cogs 38 irrotatably carried by forward drive shaft 39. Rear drive shaft 37 is journaled in rear shaft bearings 40 carried by the rearward legs 15 of the frame and forward shaft 39 is journaled in forward shaft bearings 41 supported on the forward surface of upper elongate beam 20. The medial portions of the return flight of at least the laterally outermost link chains beneath conveyor support 11 are supported by cogs 42 carried by pivotal adjustably mounted tensioning arms 43 to allow finer adjustment of tension in the conveyor chains in their return course from forward cog wheels 38 to rearward cog wheels 36. The mechanical detail of such tensioners is well known in conveyor arts and such commercial tensioners are operative with the conveyor chains, so the details thereof are not set forth in detail.

Driving mechanism 13 provides adjustable speed electric motor 44 supported on motor base 45 structurally carried by lateral beam 16 of frame 10 to extend laterally outwardly therefrom spacedly forwardly of rear conveyor shaft 37. The end portion of the shaft 37 adjacent the motor 44 extends laterally outwardly beyond the lateral portion of the adjacent frame 10 to irrotatably carry driven cog 47 carrying link chain 48 to communicate forwardly with laterally inwardly extending driving cog 46 of the motor control structure 44a to drive the rear shaft 37 responsive to motor motion.

Driving linkage for the forward drive shaft 39 provides cogwheel 49 irrotatably carried on rear shaft 37 distal from driven cog 47 and laterally outward of the adjacent frame members. The cog wheel 49 communicates by link chain 50 with medial cogwheel 51 irrotatably carried on jack shaft 56 journaled in bearing 52 structurally carried by horizontal support beam 22 to depend therefrom. The jack shaft 56 also irrotatably carries cog wheel 57 which communicates by roller link chain 53 to driven cog wheel 54 irrotatably carried on the laterally outwardly extending end portion of forward drive shaft 39. This driving linkage for the forward shaft 39 is sized and configured to drive the forward drive shaft 39 at the same rotary speed as the rearward drive shaft 37 to provide synchronous powered operation for both the forward and rearward conveyor shafts 39, 37.

With this driving linkage and with the forward and rearward conveyor cog wheels of the same size and pitch, the upper conveying flight of the conveyor link chains will be driven in both their rearward and forward portions to cause a pushing action in the forward direction in the lower rearward part of the chain course and a pulling action in a forward direction in the upper forward part of the chain course.

A OPERATION

Having described the structure of our unscrambler its operation maybe understood.

An unscrambler formed pursuant to the foregoing specification is operatively positioned and the conveyor set into motion at an appropriate speed by motor 44 responsive to operation of the associated motor controller 44a. A randomly scrambled supply of boards having longer dimensions extending in somewhat the same direction is delivered to the horizontal rearward portion 29a of the upper active flight of the conveyor with the elongate dimensions of the boards somewhat perpendicular to the course of travel of the conveyor. The delivery of this agglomeration of scrambled boards may be made in various ways, but most commonly the delivery is accomplished by a forklift vehicle, an accumulating type board conveyor having no storage hopper or an ordinary transport conveyor from which disorientated scrambled boards may be presented.

After presentment the scrambled boards move forwardly on the rearward horizontal portion 24a of the conveyor by reason of conveyor bars 34 contacting various of the adjacent boards and moving these generally underlying adjacent boards forwardly. As this occurs boards immediately adjacent the conveyor will tend to become aligned forwardly of the forward edge of the rearwardly adjacent conveyor bars 34 and any boards thereabove or forwardly thereof will tend to tumble rearwardly as the conveyor moves those boards to and on the steeper medial portion 24b of the conveyor. This process continues and accelerates as the boards approach the steepest forward part of the medial conveyor portion 24b whereat boards accumulate forwardly of each conveyor bar with the number of boards depending upon the dimensioning and width of the boards, the spacing between conveyor bars, the steepness of the medial conveyor portion and the linear speed of the conveyor. Usually one and normally not more than 2 or 3 boards will accumulate forwardly of any particular conveyor bar and this number may be regulated by adjustment of the indicated parameters. If boards are angulated to the horizontal rulings of the conveyor support, or are not completely supported on the conveyor chains rearward supported board, they will either align with a conveyor or a board supported by a conveyor or bar or tumble rearwardly to again pass through the unscrambling process, by the time the boards reach the steepest forward part of the medial portion of the conveyor support where the curvature changes from an increasingly upward curvature to a downward curvature to interconnect with the forward horizontal portion of the conveyor. The boards then proceed along the forward horizontal portion 24c of the conveyor to be delivered in an unscrambled aligned array from the forward end of the unscrambler for further processing or conveyance by ordinary transport conveyors.

It is to be noted that with the continuous conveyor support 11 spacedly below the upper portion of the conveying flight of the conveyor chains, boards moved on the conveyor that have any portion extending to and supported on the conveyor support, will tend to be aligned parallel to the conveyor bars by reason of friction between the boards and the conveyor support or to tumble rearwardly to again enter the alignment process. Boards carried by the conveyor chains in somewhat parallel orientation to an adjacent conveyor bar, but not directly adjacent to that bar or a board supported by the bar, will tend to move into adjacency with a rearward bar or supported board by reason of gravity or tumble rearwardly with substantial constancy. These reactions make the operation of the instant unscrambler most reliable and in general automatic, to require no manual intervention by an operator.

It is further to be noted that by adjustment of conveyor parameters the number of boards supported by a single conveyor bar may be adjustably predetermined.

The foregoing description of our invention is necessarily of a detailed nature so that a specific embodiment of it might be set forth as required, but it is to be understood that various modifications of detail, rearrangement and multiplication of parts might be resorted to without departing from its spirit, essence or scope.

Having described our invention, what we desire to protect by Letters Patent, and

What we claim is:

1. An unscrambler to receive scrambled agglomerations of elongate boards, convey the boards upwardly and forwardly along an S-shaped curvilinear course to unscramble them and present the boards in an aligned array at an upper forward position, comprising in combination:

a frame having horizontal areal extent with a vertically lower rearward portion and a higher upstanding forward portion;

a conveyor support supported by the frame, said conveyor support configured as a ruled surface having horizontal rulings defining an S-shaped curve in a vertical plane with a lower rearward horizontal portion interconnecting a medial forwardly and upwardly extending portion interconnecting a forward horizontal portion spacedly above the rearward portion defining at least two laterally spaced upwardly opening conveyor chain channels extending perpendicularly to the horizontal ruling lines of the conveyor support;

a conveyor carried by the frame extending about the conveyor support with a conveying flight above the conveyor support and a return flight below the conveyor support, said conveyor having;

link conveyor chains carried in the conveyor chain channel defined in the conveyor support, a laterally extending rearward drive shaft journaled on the frame and carrying spaced cogs to support the conveyor chains spacedly distant from the lower rearward portion of the conveyor support, a laterally extending forward shaft journaled on the frame carrying spaced cogs to support the conveyor chains at the upper forward portion of the conveyor support, and a plurality of elongate conveyor bars carried by the conveyor chains above the support surface to extend in spaced adjacency perpendicularly to the conveyor chains, and driving mechanism including means to synchronously drive the forward conveyor shaft and the rearward conveyor shaft in the same direction to create a pushing force on the lower rearward portion of the conveyor chains, and a pulling force on the upper forward portion of the conveyor chains to move the conveyor chains and positionally maintain them in the open top conveyor chain channels.

2. The unscrambler of claim 1 further comprising:

each conveyor chain formed by paired opposed inner links pivotally interconnecting paired opposed outer links by pin structures extending therebetween, and each conveyor chain channel defined in the conveyor support having a medial upstanding ridge to extend between adjacent surfaces of the inner links of the conveyor chains to support the pin structures in the conveyor chain channels with the chain links spacedly distant from the surfaces defining the conveyor chain channel and the upstanding ridge.

3. The board unscrambler of claim 1 further having:

at least two spaced parallel support beams supporting the conveyor support beneath each of the at least two conveyor chain channels.

4. In a board unscrambler having:

a conveyor support defining a ruled surface formed by horizontal ruling lines defining a compound curvilinear surface in a vertical plane with a first rearward horizontal portion interconnecting a second medial upwardly curving portion interconnecting a third forward horizontal portion, at least two spaced parallel upwardly opening conveyor chain channels defined in the conveyor support, and an endless link chain conveyor having a conveying flight above the conveyor support and a return flight below the conveyor support with at least two conveyor link chains carried in the conveyor chain channels and interconnected by bars extending therebetween, means for driving the conveyor chains comprising a rearward shaft drivably supporting the lower rearward portions of the at least two conveyor chains;

a forward shaft drivably supporting the upper forward portions of the at least two conveyor chains; and powering means to synchronously drive the rearward and forward shafts in the same direction to cause pushing force on the rearward portions of the conveying flights of the at least two conveyor chains and pulling force on the forward portions of the conveying flights of the at least two conveyor chains to maintain the conveyor chains in the associated conveyor chain channel defined in the conveyor support.

* * * * *